(12) United States Patent
Chorppath et al.

(10) Patent No.: US 12,335,804 B2
(45) Date of Patent: Jun. 17, 2025

(54) METHOD OF PERFORMING A HANDOVER OF A MOBILE NETWORK DEVICE

(71) Applicant: Siemens Aktiengesellschaft, Munich (DE)

(72) Inventors: Anil Kumar Chorppath, Rastatt (DE); Rohit Datta, Nuremberg (DE); Vincenzo Fiorentino, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/682,806

(22) PCT Filed: Jun. 1, 2022

(86) PCT No.: PCT/EP2022/064942
§ 371 (c)(1),
(2) Date: Feb. 9, 2024

(87) PCT Pub. No.: WO2023/020727
PCT Pub. Date: Feb. 23, 2023

(65) Prior Publication Data
US 2024/0267816 A1 Aug. 8, 2024

(30) Foreign Application Priority Data
Aug. 19, 2021 (EP) ..................... 21192086

(51) Int. Cl.
*H04W 36/14* (2009.01)
*H04W 4/44* (2018.01)
(Continued)

(52) U.S. Cl.
CPC ........... *H04W 36/142* (2023.05); *H04W 4/44* (2018.02); *H04W 28/26* (2013.01); *H04W 36/32* (2013.01);
(Continued)

(58) Field of Classification Search
None
See application file for complete search history.

(56) References Cited

U.S. PATENT DOCUMENTS

| 10,966,135 B2 | 3/2021 | Andrey et al. |
| 2009/0245199 A1* | 10/2009 | Pathan .............. H04W 36/322 370/331 |

(Continued)

FOREIGN PATENT DOCUMENTS

| EP | 2536226 A2 | 12/2012 |
| WO | 2004062178 A2 | 7/2004 |

(Continued)

OTHER PUBLICATIONS

PCT International Search Report and Written Opinion of International Searching Authority mailed Feb. 23, 2023 corresponding to PCT International Application No. PCT/EP2022/064942, pp. 1-6.

(Continued)

*Primary Examiner* — Jutai Kao
(74) *Attorney, Agent, or Firm* — Lempia Summerfield Katz LLC

(57) ABSTRACT

A method of performing a handover of a mobile network device from a first gateway device to a second gateway device includes determining the second gateway device from a plurality of gateway devices based on a movement information associated the mobile network device, wherein the movement information is indicative of a potential movement of the autonomous vehicle. The method further includes reserving one or more radio resources at the second gateway device in relation to the mobile network device and releasing one or more radio resources at the first gateway device in relation to the mobile network device. The movement information associated with the mobile network device is estimated based on at least one of process data associated with the mobile network device and the network information associated with the mobile network device.

6 Claims, 4 Drawing Sheets

(51) Int. Cl.
*H04W 28/26* (2009.01)
*H04W 36/08* (2009.01)
*H04W 36/32* (2009.01)
*H04W 76/30* (2018.01)

(52) U.S. Cl.
CPC ......... *H04W 36/322* (2023.05); *H04W 76/30* (2018.02); *H04W 36/08* (2013.01)

(56) References Cited

U.S. PATENT DOCUMENTS

| | | | |
|---|---|---|---|
| 2019/0166628 A1 | 5/2019 | Kim et al. | |
| 2019/0196456 A1* | 6/2019 | Oh | G05B 19/4186 |
| 2019/0289613 A1* | 9/2019 | Fanelli | H04W 4/40 |
| 2022/0189320 A1* | 6/2022 | Melodia | G08G 5/26 |
| 2022/0279414 A1* | 9/2022 | Tamura | H04W 48/16 |

FOREIGN PATENT DOCUMENTS

| | | |
|---|---|---|
| WO | 2017042204 A1 | 3/2017 |
| WO | 2018009340 A1 | 1/2018 |

OTHER PUBLICATIONS

PCT International Preliminary Examination Report and Written Opinion of International Examination Authority mailed Jul. 20, 2023 corresponding to PCT International Application No. PCT/EP2022/064942, pp. 1-6.

* cited by examiner

METHOD OF PERFORMING A HANDOVER OF A MOBILE NETWORK DEVICE

The present patent document is a § 371 nationalization of PCT Application Serial No. PCT/EP2022/064942, filed Jun. 1, 2022, designating the United States, and this patent document also claims the benefit of European Patent Application No. 21192086.3, filed Aug. 19, 2021, which are incorporated by reference in their entireties.

BACKGROUND

The current disclosure relates to industrial wireless networks and more particularly relates to handover of user equipment between gateway devices in an industrial environment. In industrial environments, a plurality of mobile network devices may be used for transportation of material amongst various process stations and production cells. To carry out such transportation related tasks, sufficient network resources may be made available to the mobile network devices for providing low latency communication.

SUMMARY AND DESCRIPTION

The current disclosure relates to industrial wireless networks, and more particularly, to handover of mobile network devices such as mobile robots, autonomous vehicles, etc., between two or more gateway devices. Conventionally, to provide sufficient coverage in the industrial environment, a plurality of distributed network devices are deployed in the industrial environment. Accordingly, when the mobile network devices move from one location to another location, the network aspects associated with the mobile network devices are handed over from the origin distributed unit to the destination distributed unit. However, inter-distributed unit (interDU) handover may cause interruption in communication, and may cause disruption in the QoS associated with the mobile network devices. Accordingly, interDU handover may be quite challenging in an industrial environment. Accordingly, there is a need for a method and device which addresses the above-mentioned issues around interDU handover.

Accordingly, the current disclosure describes a method, a gateway device, and a non-transitory storage medium, which address the issues mentioned above. The scope of the present disclosure is defined solely by the appended claims and is not affected to any degree by the statements within this summary. The present embodiments may obviate one or more of the drawbacks or limitations in the related art.

In a first aspect, a method is provided for performing a handover of a mobile network device from a first gateway device to a second gateway device. The method includes determining the second gateway device from a plurality of gateway devices based on a movement information associated the mobile network device, wherein the movement information is indicative of a potential movement of the autonomous vehicle. The method further includes reserving one or more radio resources at the second gateway device in relation to the mobile network device and releasing one or more radio resources at the first gateway device in relation to the mobile network device. The movement information associated with the mobile network device is estimated based on at least one of process data associated with the mobile network device and the network information associated with the mobile network device.

Accordingly, a handover method is disclosed, wherein the destination gateway device and the resource reservation are performed based on movement information associated with the mobile network device. Accordingly, the reliability of a successful handover in 5G may be achieved by combining the movement information that includes position and route information of the mobile devices that have to go across a factory floor and require high quality of service. Accordingly, schedulers at the DUs may be coordinated to provide appropriate quality of service for the mobile network device during handover.

In an example, the process data is obtained from one of a process controller associated with a first process, a manufacturing execution system associated with a first process, and a controller associated with the mobile network vehicle. Accordingly, the movement information is determined based on real time process data available in the industrial environment. In an example, the process data is indicative of a first production cell, wherein the mobile network device is configured to visit the first production cell for transfer of manufacturing material, and wherein the first production cell is within a radio coverage of the second gateway device. In an example, the movement information includes one of position information indicative of a position associated with the mobile network device, route information indicative of a route associated with the mobile network device, and velocity information indicative of a velocity associated with the mobile network device.

In an example, the method includes transmitting a route control message to the mobile network device based on an unavailability of the one or more resources at the second gateway device, wherein the mobile network device is configured to adjust one of the route associated with the mobile network device and the velocity associated with the mobile network device. Accordingly, in the example, when sufficient resources are not available at the second gateway device, the route of the mobile network device or the velocity of the mobile network device may be adjusted to the mobile network device arrives at a later time when the resources may be available or is directed to a third gateway device where sufficient resources are available. In an example, the one or more radio resources at the second gateway device are reserved for a predefined time window, wherein a start time instance of the predefined time window is associated with an arrival of the mobile network device within a radio range of the second gateway device. In an example, the start time instance is determined based on the movement information of the mobile network device.

In another aspect, the current disclosure describes a gateway device configured to perform a handover of a mobile network device to a second gateway device. The gateway device includes one or more processors connected to a memory module. The one or more processors are configured to determine the second gateway device from a plurality of gateway devices based on a movement information associated the mobile network device, wherein the movement information is indicative of a potential movement of the mobile network device. The one or more processors are further configured to reserve one or more radio resources at the second gateway device in relation to the mobile network device and release one or more radio resources at the first gateway device in relation to the mobile network device. The movement information associated with the mobile network device is estimated based on at least one of process data associated with the mobile network device and the network information associated with the mobile network device.

In yet another aspect, a non-transitory storage medium is disclosed for performing a handover of a mobile network device to a second gateway device. The non-transitory storage medium includes a plurality of instructions, which when executed one or more processors, cause the one or more processors to: determine the second gateway device from a plurality of gateway devices based on a movement information associated the mobile network device, wherein the movement information is indicative of a potential movement of the mobile network device; and reserve one or more radio resources at the second gateway device in relation to the mobile network device and release one or more radio resources at the first gateway device in relation to the mobile network device. The movement information associated with the mobile network device is estimated based on at least one of process data associated with the mobile network device and the network information associated with the mobile network device. The advantages of the method apply to the gateway device and the non-transitory storage medium. These aspects are further explained in relation to FIGS. 1-4.

DETAILED DESCRIPTION

Figure 1:
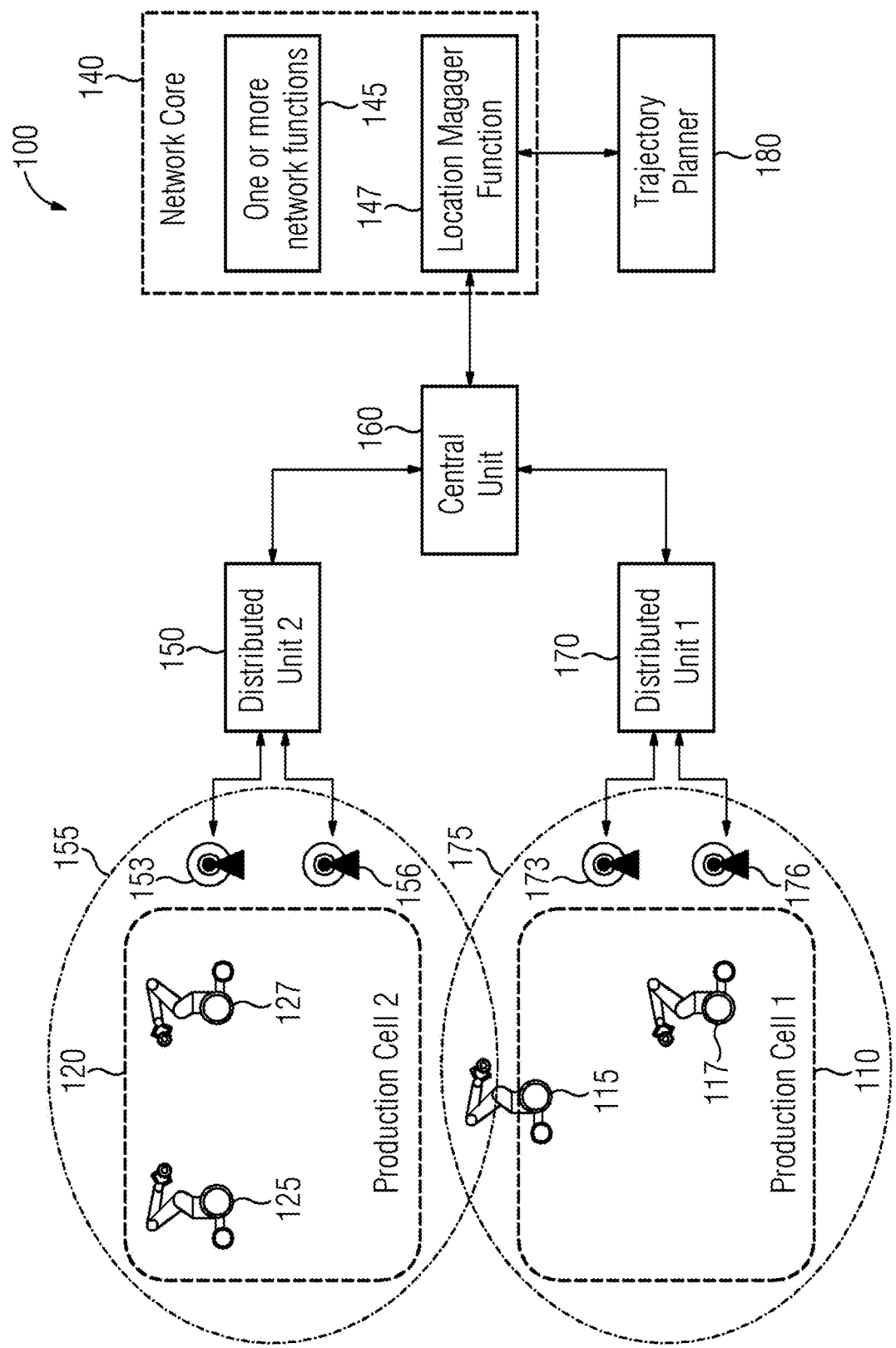
FIG. 1 illustrates a section of an example of an industrial facility including two production cells with an industrial wireless network deployed in the production cells.

FIG. 1 illustrates a section 100 of an industrial facility. Industrial facility herein refers to any environment where one or more industrial processes such as manufacturing, refining, smelting, or assembly of equipment may take place. This includes process plants, oil refineries, automobile factories, power plants, storehouses, etc. The plurality of industrial process and operations may be carried out in production cells using a plurality of devices such as control devices, field devices, mobile devices, etc., present with the corresponding production cell. The control devices include process controllers, programmable logic controllers, supervisory controllers, automated guided vehicles, robots, operator devices, etc. One or more control devices are connected to a plurality of field devices (not shown in figure) such as actuators and sensor devices for monitoring and controlling various industrial processes in the industrial facility. These field devices may include flowmeters, value actuators, temperature sensors, pressure sensors, etc. Additionally, the industrial facility includes a plurality of mobile devices (also referred to as mobile network devices) including: one or more robots for performing a plurality of operations such as welding, assembly of parts; one or more autonomous guided vehicles for transportation and handling of material; one or more assets with RFID tags on conveyor belts, etc. in the industrial facility. Additionally, the industrial facility may include an operator station for displaying the status of the industrial facility to an operator and for allowing the operator to define KPIs for the control of the industrial processes in the facility. All the industrial devices may be connected to each other via a plant network (realized via wired and wireless technologies).

Communication in the above-mentioned plant network happens through wired and wireless methods or technologies. Accordingly, the industrial facility includes a wireless network for enabling communication amongst the various devices of the industrial facility. The wireless network is based on cellular technology and includes a plurality of gateway devices. Gateway devices herein refers to one or more network devices capable of connecting the user devices to the wireless network. Examples of gateway devices include base stations, routers, switches, relays, access points, etc. The plurality of gateway devices may include stationary gateway devices that may be affixed to a plurality of locations in the industrial facility. A plurality of the user devices in the facility are connected to one or more industrial gateway devices to connect to the wireless network and for communicating information with the other devices and systems in the industrial facility. User device herein refers to an industrial device which is capable of connecting to a wireless network via the gateway devices. The user devices include one or more industrial applications which are capable of processing data from other industrial devices. Additionally, the wireless network includes a central network core 140 which includes a plurality of network functions 145 such as user plane function, authentication server function (AUSF), access and mobility function (AMF), session management function (SMF), network exposure function (NEF), etc.

For example, as shown in FIG. 1, the section 100 of the industrial facility includes a distributed base station including a central unit 160 connected to two distributed units 150 and 170. The distributed units 150 and 170 may be regarded as gateway devices. The functions/responsibilities of the central unit 160 and the distributed units (150 and 170) depend on the Split Option utilized in the implementation of the distributed base station. In certain examples, split option 7.2 is utilized and accordingly, the central unit is responsible for transfer of user data, mobility control, header compression, positioning, etc., except those functions allocated exclusively to the distributed units. The central unit controls the operation of distributed units over a front-haul interface. The distributed units include radio link control (RLC), High-media access control (MAC), Low-media access control (MAC), and upper physical (PHY) layers and their corresponding functions. RLC layer carries out segmentation. In High-MAC layer the centralized scheduling takes a high-level centralized scheduling decision. The inter-cell interference coordination in the High-MAC sublayer will be in charge of interference coordination methods such as JP/CS COMP. In Low-MAC layer, the time-critical functions in the Low-MAC sublayer include the functions with stringent delay requirements (e.g., HARQ). Upper-PHY layer does Forward Error Correction (FEC), Modulation, MIMO Layer mapping, and Rate matching.

Each distributed unit is connected to a plurality of radio units. For example, the distributed unit 150 is connected to radio units 153 and 156, and the distributed unit 170 is connected to radio units 173 and 176. The radio units 153 and 156 provide radio coverage in the production cell 110. Accordingly, the distributed unit 150 is responsible for communication within the production cell 110. The radio coverage associated with the radio units 153 and 156 (and accordingly distributed unit 150) is shown in the figure as circle 155. Similarly, radio units 173 and 176 provide radio coverage in the production cell 120. Accordingly, the distributed unit 170 is responsible for communication within the production cell 120. The radio coverage associated with the radio units 173 and 176 (and accordingly distributed unit 170) is shown in the figure as circle 175. The distributed base stations are connected to a user plane function 140 via the central unit 160 of the wireless network for transmitting data packets from the one or more user devices connected to the corresponding radio units.

Additionally, as mentioned previously, the production cells 110 and 120 include a plurality of mobile devices capable of moving within and in between the production cells (110 and 120) for transporting material and work in progress items between the production cells. The mobiles are configured to connect to the wireless network via the corresponding distributed unit associated with the production cell. For example, the mobile device 117 is connected to the wireless network via the distributed unit 170. Similarly, the mobile devices 125 and 127 are connected to the wireless network via the distributed unit 150. Because the mobile devices are capable of moving in between the production cells, the distributed unit of the source or origin production cell is configured to handover the mobile device to the distributed unit associated with the destination production cell based on the movement information associated with the mobile device obtained from a location manager function 147. For example, the mobile device 115 is moving from the production cell 110 to the production cell 120. Accordingly, the distributed unit 170 handovers the mobile device 115 to the distributed unit 150 based on the movement information of the mobile device 115. This is further explained in reference to FIG. 2.

Figure 2:
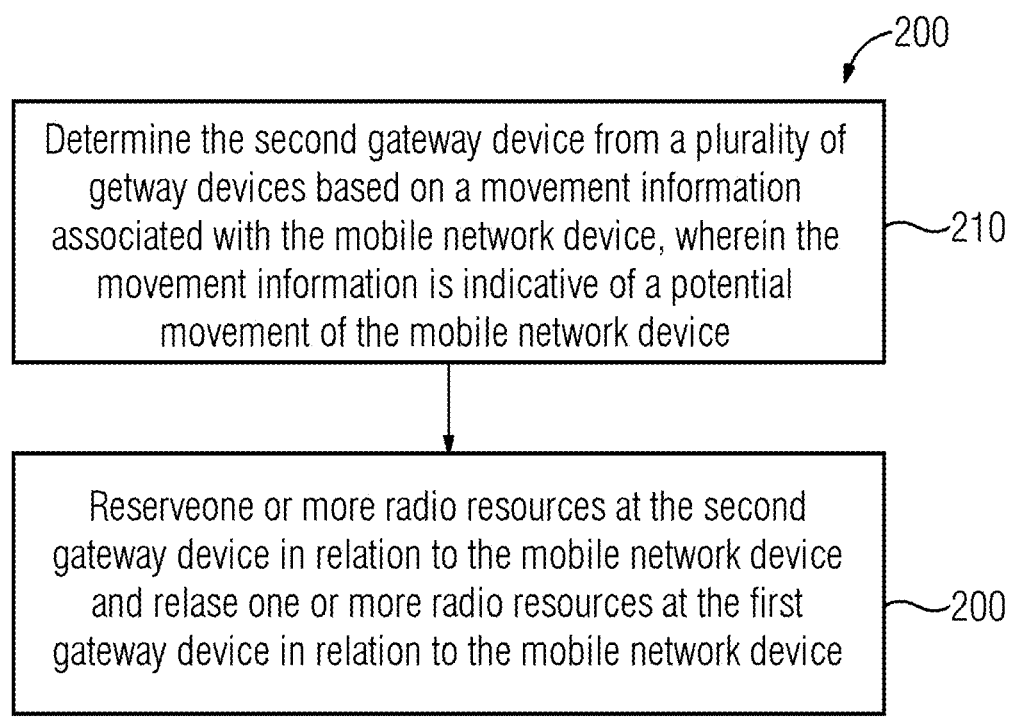
FIG. 2 illustrates an example of a method of performing a handover of a mobile network device from a first gateway device to a second gateway device.

FIG. 2 illustrates a method 200 of performing a handover of a mobile network device 115 from a first gateway device 170 to a second gateway device 150. In an example, the method 200 is implemented by the first gateway device 170.

At act 210, the first gateway device 170 determines the second gateway device from a plurality of gateway devices based on a movement information associated the mobile network device 115. The movement information is indicative of a potential movement of the mobile network device 115. The movement information associated with the mobile network device 115 is estimated based on at least one of process data associated with the mobile network device 115 and the network information associated with the mobile network device 115. Accordingly, the first gateway device 170 coordinates with the location manager function 147 and the trajectory planner module 180 of the wireless network to obtain the movement information associated with the mobile network device 115.

The trajectory planner module 180 (also referred to as trajectory planner 180) is configured to interface with one or more control devices in the production cells 110 and 120 to receive process data and determine or estimate a potential movement associated with the mobile network device 115. For example, the trajectory planner 180 is configured to interface with an autonomous vehicle controller (not shown in the figure) to receive a route plan of the mobile network device 115. Accordingly, based on the route plan, the trajectory planner 180 generates the movement information associated with the mobile network device 115.

In another example, the trajectory planner 180 interfaces with a manufacturing execution system to receive a schedule associated with mobile network device 115. Accordingly, based on the schedule, the trajectory planner 180 determines the potential movement associated with the mobile network device 115. Similarly, in another example, the trajectory planner is configured to coordinate with one or more process controllers to evaluate or determine where the mobile network device is in the schedule and then determine the potential movement associated with the mobile network device. The location management function 147 is configured to receive the movement information from the trajectory planner 180 and augment the movement information with location information from localization services available in the wireless network. For example, when the wireless network is based on 5G technology, the network includes a positioning service which is configured to determine the location and other aspects related with the mobile network device based on the network information associated with the mobile network device such as signal strength, noise to strength ratio, etc. Then, the movement information is transmitted to the first gateway device 170, which then utilizes this information to determine the second gateway device 150.

In an example, based on the location of the next destination of the mobile network device 115 and accordingly determines the distributed unit which provides the radio coverage in the destination. For example, when the destination is the production cell 120, the first gateway device 170 determines that the second gateway device is the distributed unit 150 responsible for communication within the production cell 120. In another example, the first gateway device 170 determines the second gateway device based on the route, direction and velocity associated with the mobile network device 115.

Then, at act 220, subsequent to the determination of the second gateway device 150, the first gateway device 170 reserves one or more radio resources at the second gateway device 150 in relation to the mobile network device 115 and releases one or more radio resources at the first gateway device 170 in relation to the mobile network device 115.

The reservation and release of radio resources is done in accordance with handover procedures as known in the current state of the art (for example X2-based handover and S1-based handover. For example, the first gateway device (e.g., the serving eNB) notifies the second gateway device (e.g., target eNB) that a handover is requested. The request includes a list of bearers that will be transferred and whether downlink data forwarding is necessary. The second gateway device (e.g., target eNB) acknowledges the handover request and responds with a list of bearers that are admitted along with downlink and uplink GTP tunnel endpoints to enable data forwarding. Once the resources have been set up on the second gateway device (e.g., target side), the mobile network device is notified and detaches from the first gateway device Downlink packets that are received by the first gateway device and forwarded to the second gateway device. Resources in the first gateway device are released following successful completion of the handover.

In an example, based on the above-mentioned movement information, the first gateway device 170 determines an arrival time instance, (e.g., the time instance at which the mobile network device 115 arrives within the radio range of the radio units of the second gateway device 150). The first gateway device, accordingly, coordinates with the second gateway device 150 to reserve resources for the mobile network device 115 for a predefined time window with the start of the time window at the arrival time instance. The resources to be reserved are based on the Qos associated with the mobile network device 115, which is already known to the first gateway device 170. Then, subsequent to the confirmation of the reservation of the resources at the second gateway device 150, the first gateway devices 170 schedules the resources of the first gateway device 170 associated with the mobile network device 115 to be released after the estimated arrival time instance. However, if the second gateway device 150 is unable to confirm the reservation of the resources, the first gateway device 170 is able to coordinate with the mobile network device to change the movement associated with mobile network device 115. This is further explained in reference to FIG. 3.

Figure 3:
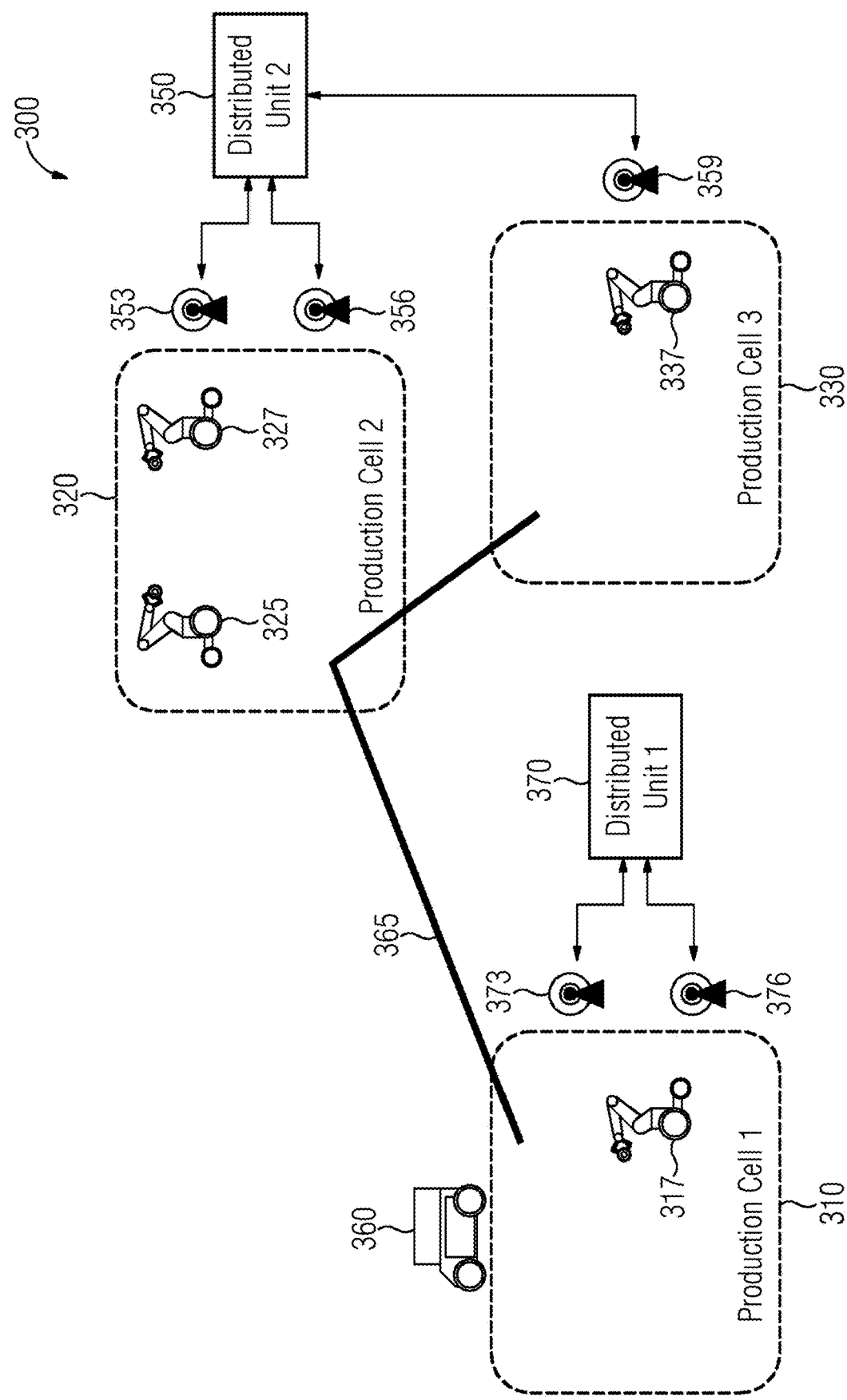
FIG. 3 illustrates an example route of an example autonomous vehicle for transporting manufacturing material between three production cells.

FIG. 3 illustrates an example section 300 of the industrial facility including three production cells 310, 320, and 330. The production cells 310 is within the coverage of the radio units 373 and 376 of the distributed unit 370. Similarly, the production cells 320 and 330 are within the coverage of the radio units 353, 356, and 359 of the distributed unit 350. Each production cell includes one or more processes and one or more mobile devices (shown in the figure as mobile robot 317, 325, 327, and 337). Additionally, the section 300 includes an autonomous vehicle 360 configured to transport materials from the production cell 310 to production cells 320 and 330. Accordingly, the autonomous vehicle 360 is configured to follow a route 365 to reach production cells 320 and 330 from the production cell 310. The route 365 is programmed by an autonomous vehicle controller (not shown in the figure).

Accordingly, the distributed unit 370 is configured to obtain the movement information associated with the autonomous vehicle 360 from the location manager function 147. In an example, the distributed unit 370 is configured to periodically check the location manager function 147 to determine if movement information is available for any of the mobile devices within its radio coverage. In another example, the trajectory planner 180 is configured to push the movement information to the corresponding distributed unit via the location manager function. Then, accordingly, using the distributed unit 370 determines the distributed unit 350 as the second gateway device. Then, the distributed unit 370 requests reservation of resources at the distributed unit 350 in relation to the autonomous vehicle 360. However, in an example, the distributed unit 350 is unable to reserve the resources required for the autonomous vehicle 360. In an example, the distributed unit 370 is configured to adjust resources currently allocated to make resources available for the autonomous vehicle 360 at the arrival time instance.

In another example, the distributed unit 350 sends a message that reservation of the resources is not possible since the resources are not available until a predefined time instance. Upon receiving a message indicative of the same, the first gateway device 370 coordinates with the autonomous vehicle 360 to change the movement associated with the autonomous vehicle 360. In a first example, the first gateway device 370 transmits a route control message to instruct the autonomous vehicle 360 to change its velocity to reach the radio range of the distributed unit 350 at a time instance later than the predefined time instance after which resources at the distributed unit 370 is available. In another example, the distributed unit 370 transmits a route control message instructing the autonomous vehicle 360 to change its route so that another distributed unit (besides the distributed unit 370) serves the autonomous vehicle 360.

In an example, the distributed unit 370 coordinates with the autonomous vehicle controller to plan a new route for the autonomous vehicle 360. Accordingly, based on movement information, the handover of the autonomous vehicle 360 is handled by the distributed unit 370 such that the QoS of the autonomous vehicle 360 is satisfied during the handover. The current method allows QoS Schedulers at DUs to optimize the amount of resources reserved and spent during handovers.

It is to be noted that while the above method 200 is explained in relation to the first gateway device, the above method may be realized in another device or a plurality of devices. For example, the method 200 may be implemented in a central network management device. Accordingly, the present disclosure may take a form of a computer program product including program modules accessible from computer-usable or computer-readable medium storing program code for use by or in connection with one or more computers, processing units, or instruction execution system.

Figure 4:
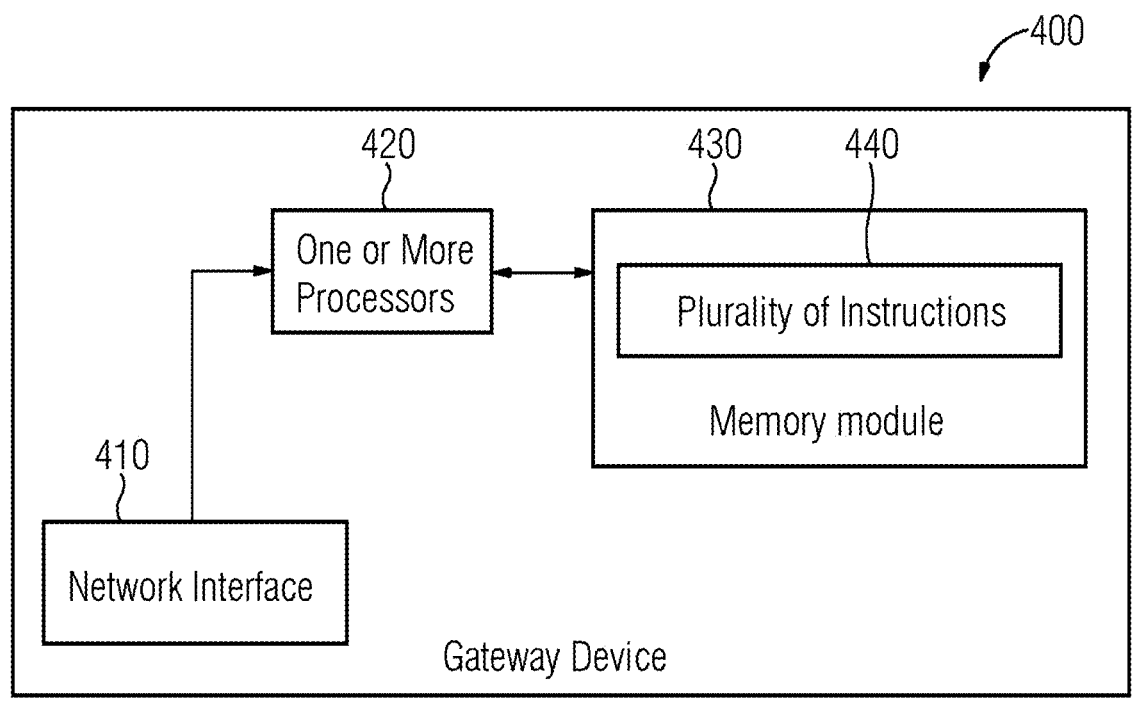
FIG. 4 illustrates an example gateway device for performing a handover of a mobile network device to a second gateway device.

Accordingly, the current disclosure describes a gateway device 400 as shown in FIG. 4. The gateway device 400 is configured to perform a handover of a mobile network device to a second gateway device. The gateway device includes a network interface 410 which is configured to send and receive data to the other network devices. Additionally, the gateway device 400 includes one or more processors 420 connected to a memory module 430 (also referred to as non-transitory storage module or medium). The memory module 430 includes a plurality of instructions 440 executable on the one or more processors 420. Upon the execution of the instructions 440, the one or more processors 420 are configured to: determine the second gateway device from a plurality of gateway devices based on a movement information associated the mobile network device, wherein the movement information is indicative of a potential movement of the mobile network device; and reserve one or more radio resources at the second gateway device in relation to the mobile network device and release one or more radio resources at the first gateway device in relation to the mobile network device. The movement information associated with the mobile network device is estimated based on at least one of process data associated with the mobile network device and the network information associated with the mobile network device.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art.

In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of performing a handover of a mobile network device from a first gateway device to a second gateway device, in an industrial facility comprising two or more production cells, wherein the mobile network device moves in between and within the two or more production cells for transporting material and work in process items between the two or more production cells, the method comprising:
    determining the second gateway device from a plurality of gateway devices based on a movement information associated the mobile network device, wherein the movement information is indicative of a potential movement of the mobile network device from the first gateway device to the second gateway device;
    coordinating a reservation of one or more radio resources at the second gateway device in relation to the mobile network device and coordinating a release of the one or more radio resources at the first gateway device in relation to the potential movement of the mobile network device; and
    transmitting, by the first gateway device, a route control message to the mobile network device based on an unavailability of the one or more radio resources at the second gateway device prior to the mobile network device reaching radio range of the second gateway device,
    wherein the movement information associated with the mobile network device is estimated based on process data associated with the mobile network device,
    wherein the process data is obtained from a process controller associated with a first process, a manufacturing execution system associated with the first process, or a mobile network device controller associated with the mobile network device,
    wherein the process data indicative of a first production cell,
    wherein the mobile network device visits the first production cell for transfer of manufacturing material,
    wherein the first production cell is within a radio coverage of the second gateway device, and
    wherein the mobile network device, using the route control message, adjusts a velocity associated with the mobile network device to reach the radio range of the second gateway device at a time instance later than a predefined time instance after which resources at the second gateway device are available.

2. The method of claim 1, wherein the movement information comprises position information indicative of a position associated with the mobile network device, route information indicative of a route associated with the mobile network device, or velocity information indicative of the velocity associated with the mobile network device.

3. The method of claim 1, wherein the one or more radio resources at the second gateway device are reserved for a predefined time window, and
    wherein a start time instance of the predefined time window is associated with an arrival of the mobile network device within the radio range of the second gateway device.

4. The method of claim 3, wherein the start time instance is determined based on the movement information of the mobile network device.

5. A gateway device configured to perform a handover of a mobile network device from a first gateway device to a second gateway device, the gateway device comprising:
    a memory; and
    one or more processors connected to the memory,
    wherein the one or more processors are configured to:
        obtain process data from a process controller associated with a first process, a manufacturing execution system associated with the first process, or a mobile network device controller associated with the mobile network device, wherein the process data is indicative of a first production cell, wherein the mobile network device is configured to visit the first production cell for transfer of manufacturing material, and wherein the first production cell is within a radio coverage of the second gateway device;
        generate movement information associated with the mobile network device based on the process data associated with the mobile network device, wherein the movement information is indicative of a potential movement of the mobile network device from the first gateway device to the second gateway device;
        determine the second gateway device from a plurality of gateway devices based on the movement information associated the mobile network device;
        coordinate a reservation of one or more radio resources at the second gateway device in relation to the mobile network device and coordinate a release of the one or more radio resources in relation to the mobile network device; and
        transmit a route control message to the mobile network device based on an unavailability of the one or more radio resources at the second gateway device prior to the mobile network device reaching radio range of the second gateway device,
        wherein the mobile network device, using the route control message, is configured to adjust a velocity associated with the mobile network device to reach the radio range of the second gateway device at a time instance later than a predefined time instance after which resources at the second gateway device are available.

6. A non-transitory storage medium configured to perform a handover of a mobile network device from a first gateway device to a second gateway device, the non-transitory storage medium comprising a plurality of instructions, which when executed by one or more processors, cause the one or more processors to:
    obtain process data from a process controller associated with a first process, a manufacturing execution system associated with the first process, or a mobile network device controller associated with the mobile network device, wherein the process data indicative of a first production cell, wherein the mobile network device is configured to visit the first production cell for transfer of manufacturing material, and wherein the first production cell is within a radio coverage of the second gateway device;

generate movement information associated with the mobile network device based on the process data associated with the mobile network device, wherein the movement information is indicative of a potential movement of the mobile network device from the first gateway device to the second gateway device;

determine the second gateway device from a plurality of gateway devices based on the movement information associated the mobile network device;

coordinate a reservation of one or more radio resources at the second gateway device in relation to the mobile network device and coordinate a release of the one or more radio resources in relation to the mobile network device; and transmit a route control message to the mobile network device based on an unavailability of the one or more radio resources at the second gateway device prior to the mobile network device reaching radio range of the second gateway device, wherein the mobile network device, using the route control message, is configured to adjust a velocity associated with the mobile network device to reach the radio range of the second gateway device at a time instance later than a predefined time instance after which resources at the second gateway device are available.

* * * * *